United States Patent [19]
Garshelis

[11] Patent Number: 5,367,257
[45] Date of Patent: Nov. 22, 1994

[54] NON-CONTACT, MAGNETIC SENSOR FOR DETERMINING DIRECTION OF MOTION AND VELOCITY OF A MOVABLE MEMBER

[76] Inventor: Ivan J. Garshelis, 176 S. Mountain Rd., Pittsfield, Mass. 01201

[21] Appl. No.: 883,339

[22] Filed: May 14, 1992

[51] Int. Cl.$^5$ .......................... G01B 7/14; G01P 3/42; G01P 13/00
[52] U.S. Cl. .......................... 324/207.22; 324/207.23; 324/174; 324/165; 324/207.20; 324/207.21
[58] Field of Search ................... 324/207.22, 233, 228, 324/173–175, 207.11–207.26, 165

[56] References Cited

U.S. PATENT DOCUMENTS 4,005,358 1/1977 Foner .................................. 324/233
4,950,988 8/1990 Garshelis .

OTHER PUBLICATIONS

Garshelis et al, "A Magnetic Position Sensor", Pape #ER-14, 4th Joint MMM–Intermag Conference; Jul. 13, 1988, pp. 1–14.
Garshelis et al, "An Improved Magnetic Position Sensor", 2 pages, Submitted Dec., 1988 to Intermag '89, Wash., D.C.
Rainer Podeswa, et al. "Differential Hall ICs for Gear Tooth Sensing in Hostile Environments" *Sensors*, Jan., 1989, pp. 34–38.
Rickman, Jr., James D., "Eddy Current Turbocharger Blade Speed Detection", *IEEE Transactions on Magnetics*, vol. Mag-18, No. 5, Sep. 1982, pp. 1014–1023.
B. M. F. Bushofa et al., "Passive Non-Contact Amorphous Speed Sensor", *IEEE Transactions on Magnetics*, vol. Mag-23, No. 5, Sep. 1987, pp. 2197–2199.

*Primary Examiner*—Gerard R. Strecker
*Assistant Examiner*—Warren S. Edmonds
*Attorney, Agent, or Firm*—Sixbey, Friedman, Leedom & Ferguson

[57] ABSTRACT

A motion sensor for detecting and providing an indication of the direction of motion along a predetermined line of travel of a smooth, uninterrupted, generally flat or gently curved, ferromagnetic target surface of a movable member includes a permanent magnet, at least one active field sensor for sensing magnetic field intensity and mounting structure for positioning the magnet and sensor along the line of travel in fixed spatial relationship to the target surface and to each other. The magnetic field of the permanent magnet, upon movement of the target surface relative to the permanent magnet along the line of travel, creates asymmetric magnetic fields along the target surface on either side of the axis which are unequal in strength in a way which is dependent upon the relative direction of motion of the target surface. The sensed magnetic intensity permits determination of the direction of motion, where the target surface is ferromagnetic, and velocity, where the target surface is conductive.

21 Claims, 5 Drawing Sheets

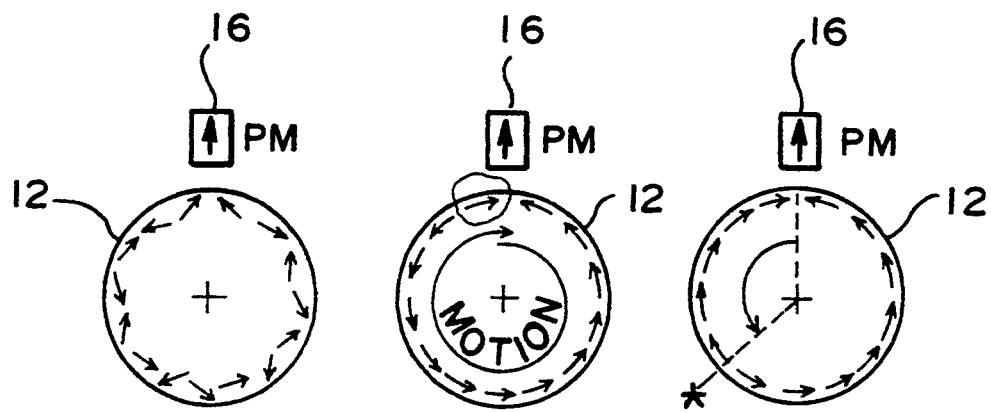
FIG. 4(a)   FIG. 4(b)   FIG. 4(c)
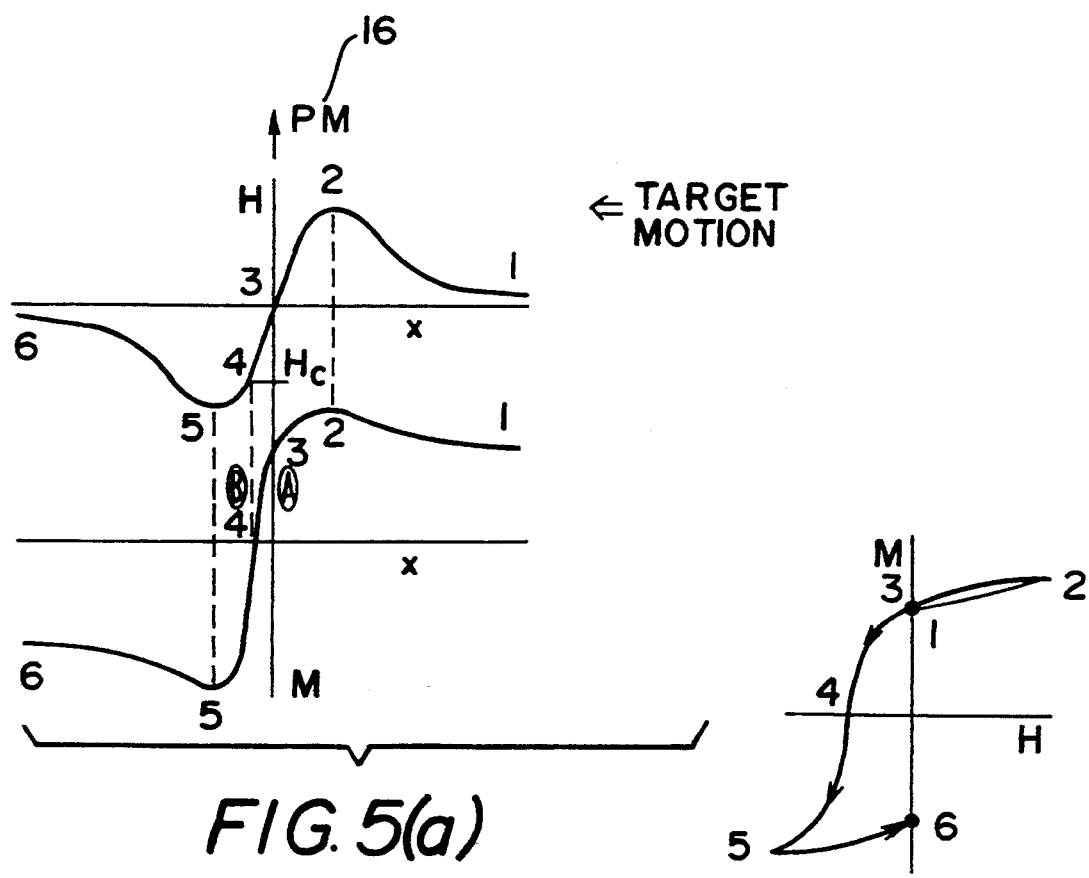
FIG. 5(a)
FIG. 5(b)

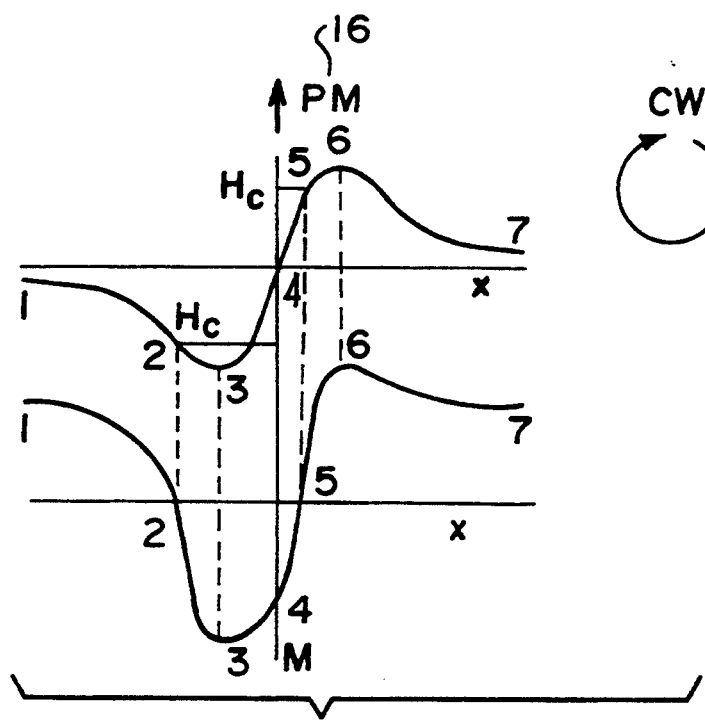
FIG.6(a)
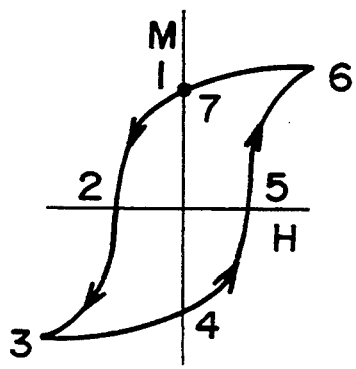
FIG.6(b)
FIG.7(b)
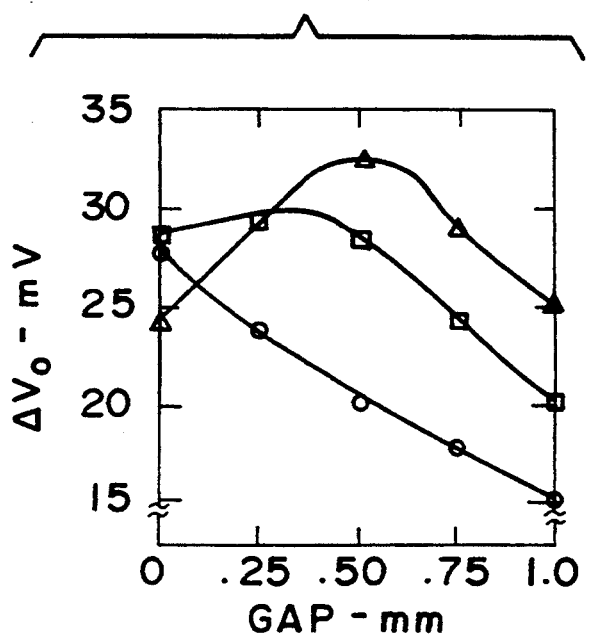
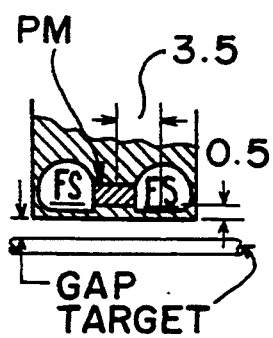
FIG.7(a)
| CONDITION | $H_c$-Oe |
|---|---|
| ○ Annealed | 14.7 |
| □ Water Quenched | 39.4 |
| △ Cold Drawn-Tempered | 23.9 |

NON-CONTACT, MAGNETIC SENSOR FOR DETERMINING DIRECTION OF MOTION AND VELOCITY OF A MOVABLE MEMBER

TECHNICAL FIELD

The present invention relates generally to direction of motion and velocity sensors and to methods employing such sensors for detecting and providing an indication of the direction of motion and velocity of a moving target surface and, more particularly, to direction of motion and velocity sensors and methods employing magnetic means for non-contact sensing.

BACKGROUND ART

The ability to obtain and indicate, in a useful manner, highly accurate information regarding the direction of motion and velocity of a movable member is very important in controlling tools, equipment and apparatus, monitoring processes, determining liquid level, and for many other purposes. Typically, due to the nature of the tools, equipment apparatus or process, the environment in which they operate and the need for continuous information, the determination of direction of motion and velocity is usually accomplished by a sensor installed proximately to the member whose motion is being sensed but out of contact therewith in order to avoid interfering with or influencing in any way the movement of the member. Moreover, the motion sensed will, most usually, be transmitted to a location remote from the movable member where it may be observed, recorded or used to control the operation of equipment or processes.

Permanent magnet sources and magnetic field sensors provide a favored combination for sensing the motion of machine parts. The advantages associated with this inherently non-contact mode of sensing are practically realizable in small, robust and low cost devices. Major applications involve the sensing of the speed and direction of rotating members. Common practice is to employ one or the other of the two general methods illustrated in FIG. 1. In FIG. 1(a), a circumferential region of the rotating "target" member is endowed with equally spaced, salient magnetic "poles," either by the attachment of discrete permanent magnets or by localized permanent magnetizations. In FIG. 1(b), rotation of a toothed, ferromagnetic target causes periodic alterations in the permeance of the magnetic circuit. The magnetic field sensor (FS) may be either a passive type, wherein an EMF is induced in a coil by the time varying magnetic field, or an active type, e.g., a Hall effect or magnetoresistive element which detects changes in magnetic field strength. Direction of motion is sensed from features of the signal or from the phase sequence of signals from two, circumferentially spaced field sensors. Speed is determined from the frequency of the periodic field sensor signal. In selecting field sensors, however, passive field sensors are particularly inappropriate for systems which require speed signals from zero rotation since such sensors are unable to measure rotation speed below a fixed threshold. For this reason, as well as the sensitivity of passive sensors to air gap changes and vibration, active sensors have become the sensors of choice.

Motion sensing methods and sensors which rely on the time interval between discrete events require that at least one such interval occur before motion can be unambiguously discerned. Moreover, rapid sensing of startup direction, large accelerations or small oscillatory motion requires closely and accurately spaced magnetized regions or physical notches on the target surface. Dealing with those requirements increases both the complexity and cost of the complete sensor.

It is, therefore, apparent that despite the availability of and advances in direction of motion and velocity sensing to date, there exists a need for a simple device for sensing both the speed and direction of motion of a target surface which requires neither teeth nor a periodic pattern of remanent magnetization; which is not time interval dependent; which is able to operate with a smooth target surface; and, which is economical, accurate and reliable.

DISCLOSURE OF THE INVENTION

In accordance with one broad aspect of the present invention there is provided an apparatus for detecting and indicating the direction of motion along a predetermined line of travel of a smooth, uninterrupted, generally flat or gently curved, ferromagnetic target surface of a movable member which comprises:

permanent magnet means having the axis of its magnetic moment oriented substantially normal to the target surface along the path of travel, the magnet means providing a magnetic field presenting a constant polarity to the target surface and having a strength at the target surface sufficient for locally polarizing the target surface, establishing a stable remanent magnetization at all points along the line of travel and reversing the local polarity of the polarized target surface whenever the target surface passes in close proximity to the magnet means, whereby movement of the target surface relative to the permanent magnet means along the line of travel creates an asymmetric magnetization gradient along the target surface around the axis of the magnetic moment and forms magnetic fields on either side of the axis which are unequal in strength in a way which is dependent upon the relative direction of motion of the target surface;

at least one active field sensor means for sensing the magnetic field intensity at a position along the line of travel; and means mounting the permanent magnet means and the at least one active field sensor means along the line of travel in fixed spatial relationship to the target surface.

In still another broad aspect of the invention the target surface line of travel comprises a pair of contiguous, oppositely polarized, remanently magnetized regions, each of the regions being uniformly magnetized along its length, the contiguous regions defining an intersection along the path of travel which is a non-uniformly magnetized transition zone substantially coincident with the axis of the magnetic moment.

In another broad aspect of the present invention there is provided a method for detecting and indicating the direction of motion along a predetermined line of travel of a smooth, uninterrupted, flat or gently curved, ferromagnetic target surface of a movable member, involving the steps of:

passing the entire line of travel of the target surface in a first direction through the magnetic field of a permanent magnet for polarizing the target surface along the line of travel in a first predetermined direction, the magnetic field of the permanent magnet presenting a constant polarity to the target surface and having a strength at the target surface sufficient for locally polarizing the target surface, establishing a stable remanent magnetization at all points along its line of travel and reversing the local polarity of the polarized target surface wherever the target surface passes in an opposite direction in close proximity to the permanent magnet;

moving the target surface relative to the permanent magnet along the line of travel for creating an asymmetric magnetization gradient along the target surface around the axis of the magnetic moment and forming magnetic fields on either side of the axis which are unequal in strength in a way which is dependent upon the relative direction of motion of the target surface;

sensing the intensity of at least one of the formed magnetic fields; and converting the sensed intensity to an electrical signal indicative of the direction of motion of the target surface along the line of travel.

In yet another aspect of the present invention the target surface is electrically conductive and the sensed intensity is converted to an electrical signal indicative of the velocity of the target surface along the line of travel.

BRIEF DESCRIPTION OF THE DRAWINGS

The invention will be better understood from the following description taken in conjunction with the accompanying drawings in which:

FIGS. 4a, 4b, and 4c are a schematic representations of an unpolarized, initially polarized and subsequent motion polarized target surface along a closed curve line of travel; FIGS. 5a and 5b are graphical representations of the horizontal component of field intensity, H(x), at the target surface, magnetization distribution, M(x), along the target surface and hysteresis loop, H v. M, for the target material for the fight to left passage of a target surface through the field of a permanent magnet;

FIGS. 6a and 6b are graphical representations of the horizontal component of field intensity, H(x), at the target surface, magnetization distribution, M(x), along the target surface and hysteresis loop, H v. M, for the target material for the clockwise passage of a target surface through the field of a permanent magnet;

FIG. 7(a) is a schematic representation of an experimental arrangement of target surface, field sensors and permanent magnet;

FIG. 7(b) is a graphical representation of the relationship between change in $V_o$ with change in direction of motion and gap;

BEST MODE FOR CARRYING OUT THE INVENTION

In accordance with the present invention there is provided a method and apparatus for detecting and providing an indication of the direction of motion along a predetermined line of travel of a ferromagnetic target surface of a movable member in which a permanent magnet means is mounted in association with and in fixed and known spatial relation to the movable target surface along its line of travel. The position of the permanent magnet means defines the intersection of a pair of contiguous, oppositely polarized, remanently magnetized regions along the line of travel of the ferromagnetic target surface. By appreciating that the two regions are contiguous and intersect along the length of the line of travel; that the magnet means is always positioned at and defines the position of the intersection; that movement of the target surface past the magnet creates an asymmetric magnetization gradient along the target surface around the axis of the magnetic moment (which is the magnet centerline for symmetrical geometry magnets), which substantially corresponds with the intersection; that magnetic fields are formed in each region on either side of the axis which are the net of the permanent magnet field and the field created by the magnetization gradient; that these net fields are unequal in strength in a way which is dependent upon the relative direction of motion of the target surface; the direction of motion (as well as the direction of last motion if the target surface is ferromagnetic) can readily be determined. It will be appreciated that in another form of the invention, the same result can be achieved and the velocity of the target surface can be detected and indicated by forming the target surface of an electrically conductive material.

Figure 1A:
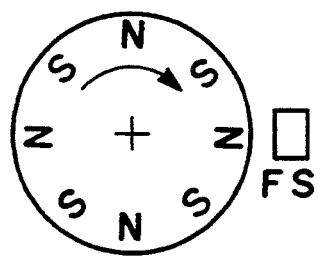
FIGS. 1a and 1b are a schematic representations of prior art direction of motion sensors.
Figure 1B:
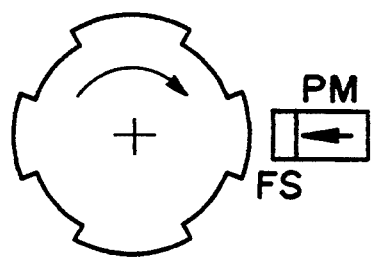
Figure 2:
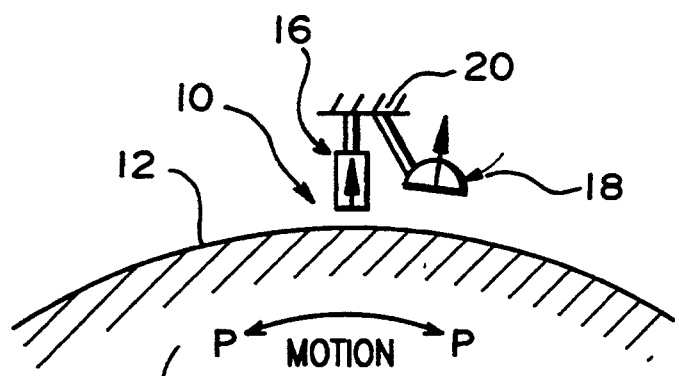
FIG. 2 is a schematic representation of the magnetic, noncontacting direction of motion sensor of the present invention.

Referring to the drawings to better understand the invention, and particularly to FIG. 2, the direction of motion sensor 10 of the present invention is illustrated schematically together with a target surface 12 of a movable member 14. Surface 12, as illustrated, is capable of unidirectional or oscillatory movement along a linear or arcuate line of travel, as indicated by arrows P, or of movement along and around a closed line of travel, such as a closed circle around the periphery of a shaft. This line of travel is an imaginary line on the target surface which maintains its spatial relationship to the permanent magnet 16 and field sensor 18 comprising the motion sensor 10 of the present invention. The target surface 12 may be any smooth, uninterrupted, flat or gently curved surface of suitable material. As can be seen in FIG. 2, there are no interruptions in the target surface along the line of travel and, therefore, the target surface between the permanent magnet 16 and field sensor 18 is at all times uninterrupted. Gently curved, as used herein, denotes a curvature of substantially constant radius. Preferably the target surface is formed of a ferromagnetic material, in which case the sensor of the present invention can be used not only to detect and indicate direction of ongoing motion but also, in the event that relative motion has ceased, to indicate the direction of last motion. Anisotropic shape or structural influences along the surface, such as shoulders, ridges, and the like, should favor magnetization orientation in the "plane" of the target surface and along the line of travel. From a magnetic standpoint, an ideal ferromagnetic target surface will have a moderate coercivity i.e., small enough to be locally polarized and for the polarization to be capable of being reversed by the field of the permanent magnet forming a part of the direction of motion sensor of the present invention and large enough to ensure a stable remanent magnetization. These requirements are usually met without special consideration since most of the steels commonly used for machine parts have suitable coercivities (5 to 50 Oe) and the fall-off of effective field with inward distance from the surface, due to shielding of the interior by the demagnetizing field from the magnetized surface regions, concentrates the magnetization near the surface. Thin target cross-sections or location of the motion sensor near ridges or edges can further improve this desirable confinement of magnetization.

A permanent magnet (PM) 16 and at least one magnetic field sensor (FS) 18 are mounted by conventional mounting means 20, such as an aluminum frame mounting the magnet and sensor encapsulated in epoxy, in known and fixed spatial relationship to the target surface and each other so that each is mounted at small, unchanging distances from the target surface and, desirably, displaced from each other along the line of travel. The axis of the magnetic moment or centerline of the magnet 16 for symmetrical geometry magnets is generally oriented to be substantially normal to the target surface 12. When so oriented the influence of the magnetic field on the magnetization of surface 12 is most localized and this is generally preferred. Desirably, but not necessarily, the sensing axis of the at least one field sensor is likewise oriented to be normal to the target surface 12 at its respective location. It will be appreciated, however, that the field sensor may be advantageously oriented other than normal to surface 12. For example, field sensor 18 may be oriented to sense fields parallel to the target surface 12 (normal to the PM). It will also be appreciated that field sensor 18 may be advantageously positioned along the centerline of magnet 16, i.e., coincident with the magnet along the path of travel, in which case it is desirable that the sensor be oriented to face left or fight rather than normal to the target along the magnet centerline.

Magnet means 16 is a localized field source. Its purpose is to initially magnetize or polarize, or to reverse the polarization in an already polarized portion of ferromagnetic target surface 12. To accomplish this, magnet means 16 desirably provides a magnetic field having a constant polarity and a strength sufficient to polarize, i.e., either locally polarize or reverse the polarization of surface 12. It is important that the magnetic field emanating from magnet means 16 influence the polarization in as local a manner as possible. It is undesirable, for example, from the standpoint of obtaining highly accurate direction of motion information, to utilize a magnet means 16 having a magnetic field which is sufficiently strong at a substantial distance from its source that it will influence the polarization of surface 12 at a substantial distance from the actual position of the magnet means. On the other hand, it is particularly desirable to utilize magnet means 16 having a magnetic field which is only strong enough to influence polarization of target surface 12 immediately adjacent the magnet means and which has a field gradient characteristic which causes the field to drop off in intensity very rapidly at even small distances from the actual position of the magnet means. Magnet means which have these desirable characteristics are advantageously positioned closely adjacent surface 12 in order to minimize the necessary field strength and to localize the effect of the field. As a minimum, the field strength at surface 12 must sufficiently exceed the coercive force of the target material in order to reverse the polarization thereof and to assure a stable remanent magnetization along the line of travel. This relationship between magnet 16 and ferromagnetic target surface 12 maintains within the target surface information as to direction of last motion as well as direction of ongoing motion. Thus, motion sensor 10, unlike prior art sensors, is not dependent on continuity of a power source for maintenance of direction of motion memory.

In addition, it should be apparent that the magnet means must provide a constant polarity to surface 12. In other words, only one pole of the magnet means can be permitted to influence the polarization of the target surface 12. Thus, if the magnet means comprises, as in a preferred embodiment, a conventional permanent magnet, such as an elongated bar magnet of any convenient cross-section, typically circular, it is desirably positioned with one end or pole thereof in close proximity to surface 12 and with the other end or pole remote from the element. If desired, for example to increase the field gradient, the pole adjacent the element may be conical or chisel-shaped. Moreover, the magnet means need not be a single simple bar magnet shape. Rather, it may comprise two or more magnets symmetrically distributed around surface 12 in a plane normal to its axis, with like poles of each magnet toward surface 12, or may be U-shaped or C-shaped, or even configured as a fully closed structure to reduce the stray field.

Field sensor 18 is typically a Hall effect or magnetoresistive element but, in general, may be any device having an electrical output proportional to magnetic field intensity. Passive sensors, most commonly of the electromagnetic induction type, deliver a low level signal which is ineffective to measure slow speeds, sensitive to changes in an air gap and to vibrations, and is generally unacceptable in the present invention.

Figure 3:
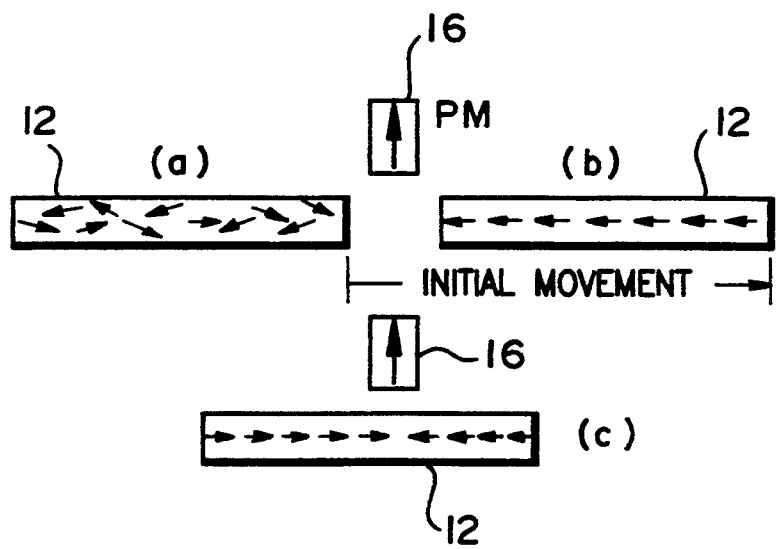
FIG. 3 is a schematic representation of an unpolarized, initially polarized and subsequent motion polarized target surface along an oscillatory line of travel.

Two modes of sensor operation need to be distinguished, oscillatory and closed curve. Thus, with purely oscillatory motion, e.g., reciprocating motion, such as a control rod moving along a linear path into and out of a nuclear reactor core or similar back and forth reciprocation along a fixed arcuate line of travel, no point on the target surface may pass the field sensor more than once without changing direction. In the other mode the path of motion is a closed curve, such as a full circle, wherein points on the target surface may pass the field sensor any number of times in the same direction before (or perhaps without ever) reversing. An example of closed curve motion is a path of travel around the periphery of a shaft. For either mode of operation a ferromagnetic target surface must be magnetically preconditioned or "initialized" by uniformly magnetizing (polarizing) the target surface 12 along the entire length of its line of travel. This can be conveniently accomplished by movement of the target surface 12 in a single direction past the permanent magnet 16 over the full path of motion, whether that path be linear, arcuate or closed curve. For example, the results of both initializing and further motion on the magnetization in regions of the target surface far enough from the permanent magnet 16 to escape its direct influence are illustrated in FIG. 3 for the oscillatory mode and FIG. 4 for the continuous curve mode. With reference to FIG. 3, initializing can be accomplished by moving the unpolarized target surface 12 shown in FIG. 3(a) from left to right past magnet 16 to align the magnetization within the surface 12 in a single direction. When the magnet 16 reaches the left-hand end of surface 12, all magnetization within the surface, random or otherwise has been realigned and the segment has been polarized. See FIG. 3(b). Subsequently, it may be convenient to move target surface 12 back to the left. Such movement has the effect of reversing the polarization in the portion of the surface between the left end and the position of magnet 16. See FIG. 3(c). With the magnet means positioned as shown in FIG. 3(c), two oppositely polarized and remanently magnetized regions are defined along the length of the path of travel of the target surface 12. The intersection of the two regions, which are contiguous, is at the centerline position of magnet means 16. It will be appreciated that any further movement of magnet means 16 to the left or right serves to alter the position of the intersection. However, irrespective of the movement of the target surface along the line of travel, the target surface 12 remains polarized into two regions which are magnetized in opposite directions. The direction of the remanent magnetization at any one point along the target surface is seen to depend on the direction of its last occurring motion past the permanent magnet. This is why it is so important that the field of magnet 16 be sufficiently strong at the target surface 12 to create a stable remanent magnetization along the entire path of travel. The very same analysis holds true for the closed curve mode, as can be seen in FIGS. 4(a), (b) and (c).

In order to understand how the sensor of the present invention operates to detect and indicate direction of motion of a ferromagnetic target surface moving along its line of travel past a permanent magnet 16 it is necessary to examine the horizontal component of field strength distribution H(x) due to magnet 16 at the target surface 12 as well as the hysteresis loop for the ferromagnetic material forming the target surface 12. In so doing the effect of the vertical component of the magnetic field can be excluded since it is symmetrical around the magnet centerline and it cannot affect the remanent magnetization in the target surface since any magnetization normal to the surface will be offset by concurrent creation of a strong demagnetizing field. From the H(x) and hysteresis loop information the effect on the magnetization within the target M(x) can be ascertained and is shown in FIG. 5 for the oscillatory mode and in FIG. 6 for the closed curve node.

Referring first to FIG. 5 it can be seen for a target surface moving past magnet 16 from right to left that the magnetization at each point on the moving target surface undergoes a complete minor loop excursion (1-2-3) as it approaches the PM axis (approach side) and a half major loop reversal (3-4-5-6) as it passes by the PM axis (downstream side). Although these magnetization excursions take place progressively along the moving target, the magnetization distribution along the target, M(x), appears fixed. M(x) has three readily distinguishable regions: one uniformly magnetized region where $M(x) = M_r$ off to one side of the PM, a similarly magnetized region where $M(x) = -M_r$ off to the other side of the PM and a non-uniformly magnetized transition zone close by the PM.

It is clear from FIG. 5 that the variation in the magnetization, dM/dx, in the transition zone within the 3-5 region, on the downstream side of the magnet axis, is substantially larger than in the equal length region 2-3 on the approach side of the PM. It should be understood that these "approach" and "downstream" sides become interchanged for target motion from left to right, i.e., opposite to that indicated. It should also be understood that since these magnetization distributions have no temporal variation in the PM frame of reference, approach and downstream sides are immediately established and, therefore, only alterable at the onset of target motion. The important point is that there is an asymmetrical magnetization gradient along the target surface 12 and the pattern is reversed for reverse motion of the target. If the motion stops, the existing gradient is frozen, thus reflecting the direction of last motion. A magnetization gradient within a magnetized body, dM/dx, is the source of an external magnetic field. Thus, the steeper the magnetization gradient the larger the local field in the space near the target surface. Since the magnetization gradients are asymmetrical around the magnet centerline there will be different strength fields on either side of the magnet due to these gradients. The total field on either side of the magnet is the combined fields—the field of the permanent magnet plus the field due to the magnetization gradient within the target surface. Inasmuch as the fields of the magnet are symmetrical around the magnet axis, the net fields on each side are unequal in a way that depends on the direction of motion (or last motion) of the target surface.

A field sensor located on one or the other side of the magnet will sense a different field depending on whether it is on the "approach" side or the "downstream" side. Two field sensors, such as sensors "A" and "B" in FIG. 5, symmetrically located on each side of the magnet, will always be sensing different fields. The difference in these fields will cancel the effect of the field from the magnet (common mode rejection) leaving only the difference in the fields due to the asymmetrical magnetization gradient.

Assuming in FIG. 5 that there is only a field sensor positioned at "B", and appreciating that sensor B normally sees $H_{PM}$, if sensor B senses a field, $H_B$, which is significantly different from $H_{PM}$ it must be on the downstream side where the field due to the magnetization gradient is large and, therefore, the target surface must be moving from right to left. This is because $H_B$, when the target surface is moving from left to right, is on the approach side, at which position dM/dx is insubstantial and $H_B$ approximates $H_{PM}$.

The total field at the field sensor, being the resultant of the symmetrical field from the magnet and the asymmetrical fringing field from the ferromagnetic target, is thus dependent on whether its location description, as determined by the direction of last occurring target motion, is upstream or downstream of the magnet. The signal from the field sensor thereby indicates the last starting direction of motion of the target even if it is no longer moving.

Closed curve mode operation has an additional feature. As seen in FIG. 4(b), following the initializing movement, the target is remanently magnetized continuously in one direction along its periphery except in the circled region close to the permanent magnet. The magnetization altering events taking place in this region, if the target moves only in the CW direction, are shown in FIG. 6 and include the horizontal component of field strength, H(x), due to magnet 16 at the target surface as well as the hysteresis loop for the ferromagnetic material forming the target surface 12. The magnetization is taken around a complete hysteresis loop by the field of the PM, leaving the PM vicinity with the same polarity as it entered. As can be seen from the curve of magnetization vs. circumferential distance, x, on either side of the magnet axis for CW rotation, the magnetization gradient in region 3–4 (approach) is substantially less than in equal length region 4–5–6 (downstream). For CCW rotation the asymmetry is reversed. These asymmetrical magnetization gradients are the sources of unequal fields on the two sides of the magnet axis and this asymmetry reverses with direction of motion (or last motion). One or more field sensors will thus detect the direction of motion exactly like in the oscillatory mode.

In FIG. 4(c) it is seen that the initial effect of reverse movement is to divide the target periphery into two contiguous, oppositely magnetized regions. Until further movement, in either direction, brings the second transition zone, indicated by *, to the "approach" vicinity of the PM, the only indication of motion direction will be the fringing field from the downstream transition. This is as expected since directional changes following motions smaller than the entire target periphery are indistinguishable from oscillatory mode motions.

In addition to its ability to detect and indicate direction of motion (last motion) the sensor of the present invention is capable of detecting and indicating the velocity of the target surface 12. This ability is due to the eddy currents induced in the target surface as it moves past permanent magnet 16. In order to detect target velocity the target surface must be an electrically conductive material but need not be ferromagnetic. Where it is conductive but not ferromagnetic the sensor can detect direction of motion (but not of last motion) and velocity. Thus, in such a case the line of travel need not be in fixed spatial relationship to the magnet 16 and field sensor 18. Where the target is ferromagnetic and conductive, direction of last motion can be detected as well.

Having in mind a graphical representation of the axial component of magnetic field due to the permanent magnet as a function of distance, x, from the magnet axis, when a point on the conductive surface approaches along the x axis from either the left or right side it first encounters an increasing field and, after passing the magnet axis, a decreasing fields. The circulation direction of the induced eddy currents will be such as to create opposing reaction fields, i.e., the created fields will act to reduce the change in field of the permanent magnet. Thus, approaching from the left side, where points on the target surface first experience an increasing field, the field from the eddy currents will tend to reduce the field frown the magnet whereas, on the right side of the magnet axis, where the target surface experiences a decreasing field, the field from the eddy currents will tend to increase the field from the magnet. Thus, field sensors located on either side of the magnet axis will experience different fields, smaller on the approaching side and larger on the downstream side. The magnitude of these eddy currents will depend upon the velocity as well as the proximity of the magnet to the target surface and the resistivity of the target material.

Figure 10:
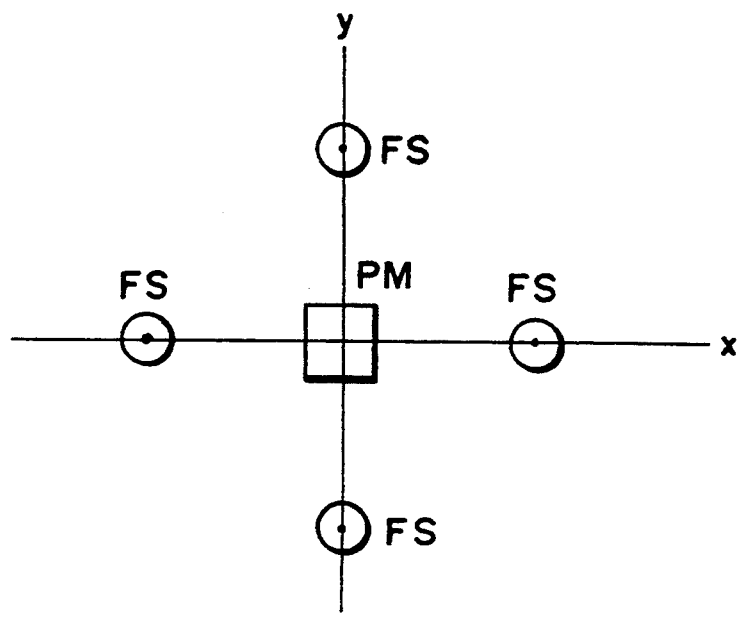
FIGS. 10 and 11 are alternate sensor arrangements in accordance with the present invention.
Figure 11:
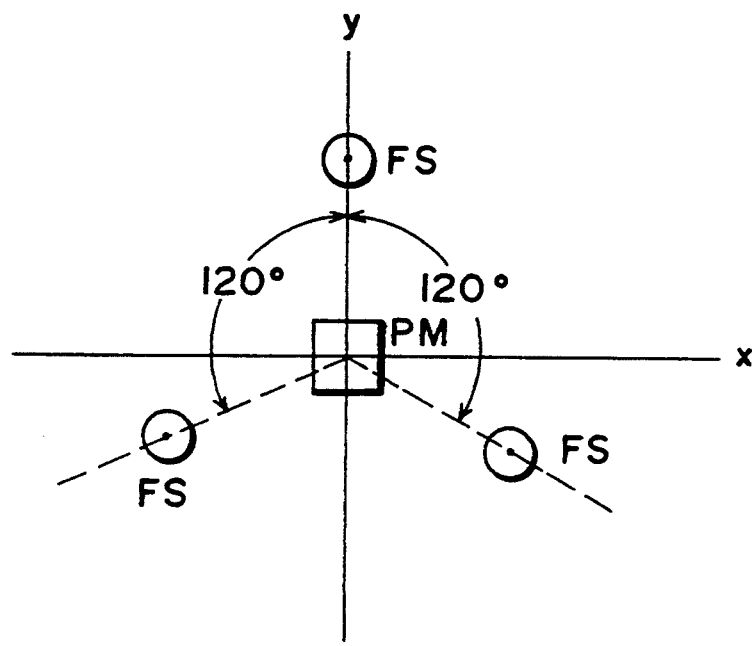

Thus, where there is only one sensor, such as sensor B in FIG. 5, if it senses a field less than the permanent magnet field, the target surface is moving from left to right at a velocity indicated by the strength of the signal. Likewise, if sensor B senses an increasing field, the target surface is moving from right to left at a velocity indicated by the strength of the signal. Where there are two sensors, such as sensors A and B in FIG. 5, the resultant signal is the difference between the fields at A and B. The magnitude of the difference signal is indicative of velocity and the sign of the signal is indicative of direction. The use of two sensors allows symmetry around zero and the use of the signal sign to identify direction. Two sensors, via common mode rejection, eliminate spurious fields and changes in magnetic fields due to temperature, etc. and produce a signal singly dependent upon the target characteristics. The use of multiple sensors provides x-y velocity vectors. To accomplish this a permanent magnet may be arranged on the crossed x-y axes and a pair of sensors arranged on either side of the magnet on the x-axis and the y-axis for a total of four sensors, as shown in FIG. 10. Alternatively, three sensors can be arranged at 120° spacing around the magnet axis, as shown in FIG. 11.

In order to demonstrate the utility and construction of the sensor of the present invention an experimental direction of motion sensor (DMS) was constructed incorporating two FSs (Texas Instruments Inc. TL 173C Linear Hall Effect Integrated Circuit) symmetrically disposed 3.5 mm on either side of a 2.5 mm square by 1.5 mm long Nd-Fe-B, PM. The FSs and PM were mounted on an aluminum frame and encapsulated in epoxy with the IC chips and the magnet face in approximately the same plane, 0.5 mm back from the DMS face (FIG. 7(a)). Two FSs were used to reduce sensitivity to ambient fields (low gradient) and provide symmetrical outputs of opposite polarity for the two directions of motion. When powered with 12 VDC, each FS had an output signal of $6.0 \pm .0015H$ volts (H in Oe). The difference in the two FS outputs constituted the DMS output signal, $V_o$.

In FIG. 7(b), the sensitivity, i.e., the difference in $V_o$ for target motion to the left and to the right, is plotted against the gap between the DMS face and 0.736 mm dia., high carbon steel, wire targets in the conditions indicated in the figure. While the three targets show similar maximum sensitivities which eventually fall off at similar rates with increasing gap, the maxima clearly occur at different gaps. This illustrates the dependence of M(x) and its consequential fringing field on the magnetic properties of the target.

Figure 8:
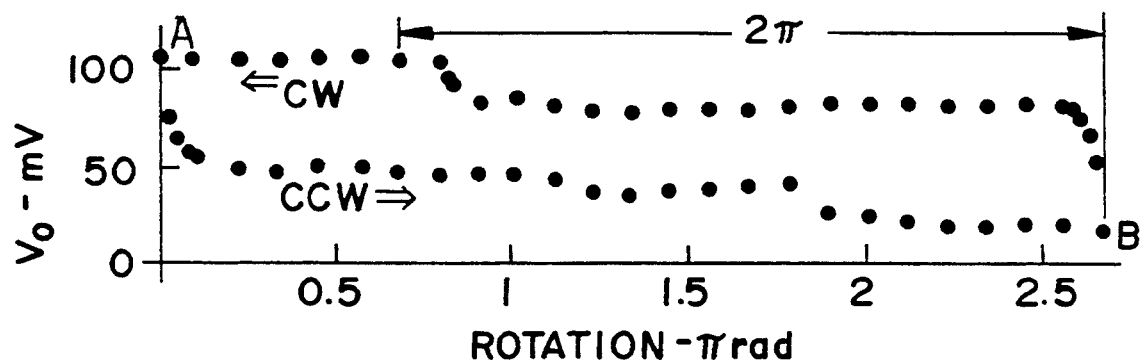
FIG. 8 is a graphical representation of the relationship between change in $V_o$ with change in direction of rotation and extent of rotation.

Closed curve mode operation is illustrated in FIG. 8 where $V_o$ (with arbitrary zero) is plotted against the rotational position of a 0.3 mm thick, hardened tool steel disk (a circular saw blade). The DMS was located at a radius of 25 mm with a 0.25 mm gap. The changes in $V_o$ after reversal in the direction of motion are seen to take place in two steps: an immediate change indicative of the movement of the downstream transition zone from one side of the PM to the other and a further change, in the same direction, as the fringing field from the original approach side transition nears the other FS.

Figure 9:
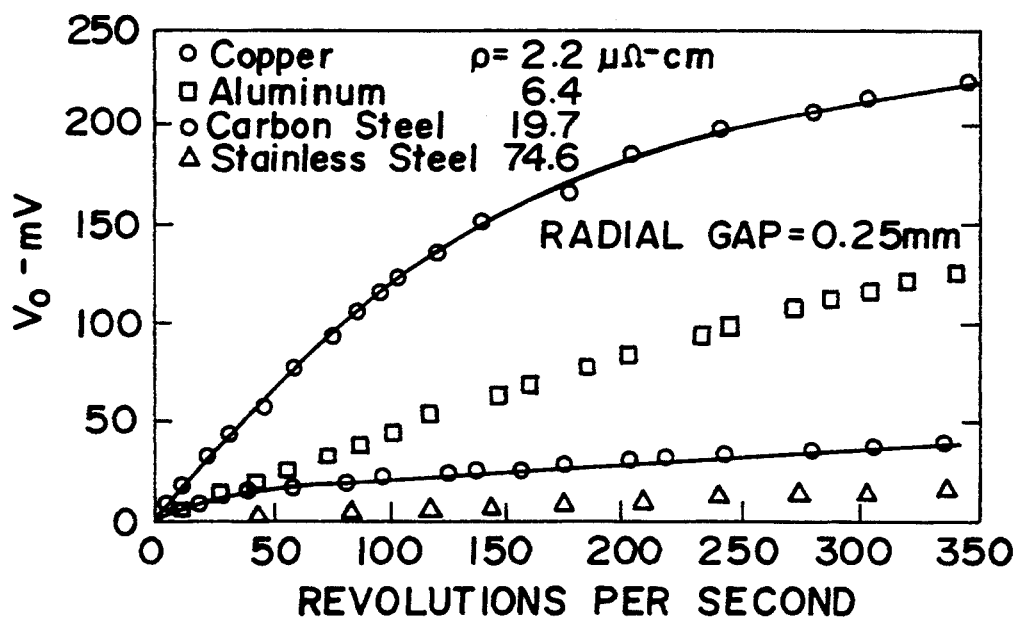
FIG. 9 is a graphical representation of the relationship between $V_o$ and rotational speed.

Velocity effects are illustrated in FIG. 9 where $V_o$ is plotted against the rotational speed of cylindrical targets 55.3 mm diam. × 6.35 mm thick of the materials indicated. As expected the output signal increases with both speed and conductivity and with slopes that diminish fastest with higher conductivity (copper) or with ferromagnetic (carbon steel) targets.

While the present invention has been described with respect to particular embodiments thereof, it will be appreciated that numerous modifications may be made by those skilled in the art without actually departing from the scope of the claimed invention. Accordingly, all modifications and equivalents may be resorted to which fall within the scope of the invention as claimed.

I claim:

1. A motion sensor for detecting the direction of ongoing motion, last occurring motion and/or velocity along a predetermined line of travel of a smooth, uninterrupted, generally flat or gently curved, ferromagnetic, conductive or ferromagnetic and conductive target surface of a movable member comprising:

permanent magnet means providing a magnetic field presenting a constant polarity to said target surface, the magnetic field of said permanent magnet creating, upon movement of said target surface relative to said permanent magnet means along said line of travel, asymmetric magnetic fields from and along said target surface on either side of and close being axis of the permanent magnet means magnetic moment, said fields being unequal in strength in a way which is dependent upon the relative direction of motion of the target surface;

at least one active field sensor means for sensing the magnetic field intensity at a position along the line of travel, whereby the asymmetry of total magnetic fields on either side of said axis can be sensed and the direction of ongoing motion, direction of last occurring motion and/or velocity determined therefrom; and means for mounting said permanent magnet means with the axis of its magnetic moment oriented substantially normal to the target surface along the line of travel and for mounting said permanent magnet means and said at least one active field sensor means along said line of travel in fixed spatial relationship to said target surface and to each other, the distance between said axis and said at least one active field sensor means being less than the uninterrupted distance along the line of travel of said target surface.

2. A motion sensor as claimed in claim 1, wherein said target surface is ferromagnetic or ferromagnetic and conductive and wherein said permanent magnet means has a strength at the target surface sufficient for locally polarizing said target surface and establishing a stable remanent magnetization at all points along its line of travel and for reversing the local polarity of the polarized target surface wherever said target surface passes in close proximity thereto, whereby at least the direction of last occurring motion is determinable from the sensed intensity.

3. A motion sensor as claimed in claims 1 or 2, wherein said at least one active field sensor is offset from the axis of the magnetic moment along the line of travel.

4. A motion sensor as claimed in claims 1 or 2, wherein the axis of said at least one active field sensor is substantially normal to the target surface.

5. A motion sensor as claimed in claims 1 or 2, wherein said at least one active field sensor is positioned along the axis of the magnetic moment and the axis of said at least one active field sensor is substantially parallel to the target surface.

6. A motion sensor as claimed in claims 1 or 2, wherein said at least one active field sensor is a Hall effect sensor.

7. A motion sensor as claimed in claims 1 or 2, wherein said at least one active field sensor is a magnetoresistive sensor.

8. A motion sensor as claimed in claims 1 or 2, wherein said at least one active field sensor comprises multiple active field sensors.

9. A motion sensor as claimed in claim 8, wherein said at least one active field sensor comprises at least one active field sensor positioned on each side of the axis of the magnetic moment along the line of travel.

10. A motion sensor, as claimed in claim 8, wherein said at least one active field sensor comprises four active field sensors spaced at 90° intervals around the periphery of said permanent magnet means.

11. A motion sensor, as claimed in claim 8, wherein said at least one active field sensor comprises three active field sensors spaced at 120° intervals around the periphery of said permanent magnet means.

12. A motion sensor, as claimed in claim 1, wherein the target surface is either conductive or ferromagnetic and conductive and the sensed magnetic field intensity is indicative of the velocity of said target surface relative to said permanent magnet means.

13. A method for detecting the direction of ongoing motion, last occurring motion and/or velocity along a predetermined line of travel of a smooth uninterrupted, generally flat or gently curved, ferromagnetic, conductive, or ferromagnetic and conductive target surface of a movable member, comprising the steps of:

a) arranging a permanent magnet and at least one active field sensor in fixed spatial relationship to each other along the line of travel with said permanent magnet and said at least one active field sensor spaced apart a distance less than the uninterrupted distance along the line of travel of said target surface;

b) mounting said permanent magnet and said at least one active field sensor in fixed spatial relationship to said target surface with the magnetic field of said permanent magnet presenting a constant polarity to said target surface and the axis of the permanent magnet's magnetic moment oriented substantially normal to the target surface along the line of travel;

c) moving said target surface relative to said permanent magnet along said line of travel for creating asymmetric magnetic fields on either side of said axis which are unequal in strength in a way which is dependent upon the relative direction of motion of the target surface;

d) sensing the intensity of the magnetic fields at said at least one active field sensor; and e) converting the sensed intensity to an electrical signal indicative of the direction of ongoing motion, last occurring motion and/or velocity of said target surface along said line of travel.

14. A method, as claimed in claim 13, wherein the target surface is ferromagnetic or ferromagnetic and conductive, including the additional step prior to moving said target surface of:

passing the entire line of travel of said target surface in a first direction through the magnetic field of said permanent magnet for polarizing said target surface along said line of travel in a first predetermined direction, said permanent magnet magnetic field having a strength at the target surface sufficient for locally polarizing said target surface and establishing a stable remanent magnetization at all points along its line of travel and for reversing the local polarity of the polarized target surface whenever said target surface passes in an opposite direction in close proximity to said permanent magnet.

15. A method, as claimed in claims 13 or 14, wherein said at least one active field sensor is arranged with said at least one active field sensor offset from the axis of the magnetic moment along the line of travel.

16. A method, as claimed in claims 13 or 14, wherein said at least one active field sensor is mounted with its axis substantially normal to the target surface.

17. A method as claimed in claims 13 or 14, wherein said at least one active field sensor is positioned along the axis of the magnetic moment and the axis of said at least one active field sensor is substantially parallel to the target surface.

18. A method as claimed in claims 13 or 14, wherein said at least one active field sensor comprises multiple active field sensors.

19. A method, as claimed in claims 13 or 14, wherein at least one active field sensor is arranged on each side of the axis of the magnetic moment along the line of travel.

20. A method, as claimed in claims 13 or 14, wherein four active field sensors are arranged at 90° spaced intervals around the periphery of said permanent magnet.

21. A method, as claimed in claims 13 or 14, wherein three active field sensors are arranged at 120° spaced intervals around the periphery of said permanent magnet.

* * * * *